(12) United States Patent
Janajreh

(10) Patent No.: US 6,412,531 B1
(45) Date of Patent: Jul. 2, 2002

(54) TIRE TREAD HAVING GROOVE WALLS WITH COMPOUND CONTOURS

(75) Inventor: Ibrahim Mustafa Janajreh, Fountain Inn, SC (US)

(73) Assignee: Michelin Recherche et Technique S.A. (CH)

(*) Notice: Subject to any disclaimer, the term of this patent is extended or adjusted under 35 U.S.C. 154(b) by 0 days.

(21) Appl. No.: 09/353,466

(22) Filed: Jul. 15, 1999

(51) Int. Cl.[7] .................. B60C 11/04; B60C 11/12; B60C 11/13; B60C 101/02; B60C 105/00

(52) U.S. Cl. ............... 152/209.21; 152/209.23; 152/900; 152/901; 152/DIG. 3

(58) Field of Search .............. 152/209.18, 209.21, 152/209.23, DIG. 3, 900, 901, DIG. 1, 209.27

(56) References Cited

U.S. PATENT DOCUMENTS

| | | | |
|---|---|---|---|
| 2,109,691 A | * 3/1938 | D'avguesvives | 152/DIG. 3 |
| 2,122,736 A | 7/1938 | Bourdon | |
| 2,322,505 A | * 6/1943 | Bull | 152/209.21 |
| 2,327,057 A | * 8/1943 | Ofensend | 152/209.21 |
| 2,661,041 A | 12/1953 | Walsh | |
| 2,756,460 A | * 7/1956 | Heintz | |
| 2,765,797 A | 7/1956 | Campbell | |
| 2,843,172 A | * 7/1958 | Berry et al. | 152/209.21 |
| 2,869,609 A | 1/1959 | Billingsley et al. | |
| 3,055,410 A | * 9/1962 | Caulkins | 152/209.21 |
| 3,095,024 A | 6/1963 | Robertson | |
| 3,511,290 A | * 5/1970 | Kutsmichel | 152/209.21 |
| 3,608,602 A | 9/1971 | Youngblood | |
| 3,664,402 A | 5/1972 | Montagne | |
| 3,951,193 A | 4/1976 | Yeager | |
| 4,031,938 A | 6/1977 | Verdier | |
| 4,114,671 A | * 9/1978 | Marocchi et al. | 152/209.21 |
| 4,298,046 A | * 11/1981 | Herbelleau et al. | |
| 4,566,514 A | * 1/1986 | Mauk et al. | 152/DIG. 3 |

(List continued on next page.)

FOREIGN PATENT DOCUMENTS

| | | | |
|---|---|---|---|
| EP | 664230 | * 7/1995 | |
| FR | 2418719 | * 9/1979 | |
| JP | 60-252 005 | 12/1985 | |
| JP | 2-155808 | * 6/1990 | 152/209.23 |
| JP | JO 2 246 806 | 10/1990 | |
| JP | 2-246810 | * 10/1990 | 152/DIG. 3 |
| JP | JO 3007 603 | 1/1991 | |
| JP | 3-86605 | 4/1991 | |
| JP | 4-63704 | 2/1992 | |
| JP | 4-183609 | 6/1992 | |
| JP | 4-189606 | * 7/1992 | 152/209.18 |
| JP | 6-48123 | * 2/1994 | 152/209.21 |
| JP | 6-312603 | * 11/1994 | 152/209.21 |
| JP | 7-329511 | * 12/1995 | |
| JP | 8-216624 | 8/1996 | |
| JP | 9-183303 | * 7/1997 | 152/DIG. 3 |
| JP | 10-315715 | * 12/1998 | 152/DIG. 3 |
| JP | 11-192818 | 7/1999 | |

OTHER PUBLICATIONS

Patent Abstracts of Japan, 03086605 (Apr. 11, 1991).
Patent Abstracts of Japan, 04183609 (Jun. 30, 1992).
Patent Abstracts of Japan, 08216624 (Aug. 27, 1996).
Patent Abstracts of Japan, 11192818 (Jul. 21, 1999).

*Primary Examiner*—Steven D. Maki
(74) *Attorney, Agent, or Firm*—Martin Farrell; Felipe J. Farley; Alan A. Csontos

(57) ABSTRACT

A tread for a tire includes at circumferentially extending grooves having side walls contoured with upper and lower waveforms that are relatively staggered, or out of phase. The side walls provide alternating protrusions and recesses relative to a perpendicular reference plane passing through upper edges of the groove. A cavity is provided beneath upper groove edges for the entire circumference of the tread, which imparts flexibility and helps avoid the initiation of rail wear.

3 Claims, 4 Drawing Sheets

U.S. PATENT DOCUMENTS

| | | | |
|---|---|---|---|
| 4,705,088 A | * 11/1987 | Ghilardi | 152/DIG. 3 |
| 4,794,965 A | 1/1989 | Lagnier | |
| 4,836,257 A | * 6/1989 | Mamada et al. | 152/209.23 |
| 4,994,126 A | 2/1991 | Lagnier | |
| 5,099,899 A | * 3/1992 | Takeuchi | 152/209.21 |
| 5,176,765 A | * 1/1993 | Yamaguchi et al. | 152/DIG. 3 |
| 5,198,047 A | * 3/1993 | Graas et al. | 152/DIG. 3 |
| 5,287,905 A | * 2/1994 | Caretta et al. | 152/DIG. 3 |
| 5,350,001 A | * 9/1994 | Beckmann et al. | 152/209.21 |
| 5,535,798 A | * 7/1996 | Nakamura | 152/209.21 |
| D390,170 S | 2/1998 | Stone et al. | |
| 5,769,977 A | 6/1998 | Masaoka | |
| 5,783,002 A | 7/1998 | Lagnier | |
| 5,833,779 A | * 11/1998 | Van der Meer et al. | 152/DIG. 3 |
| 5,851,322 A | * 12/1998 | Hayashi | 152/DIG. 3 |
| 5,918,654 A | * 7/1999 | Bossut | 152/209.18 |

* cited by examiner

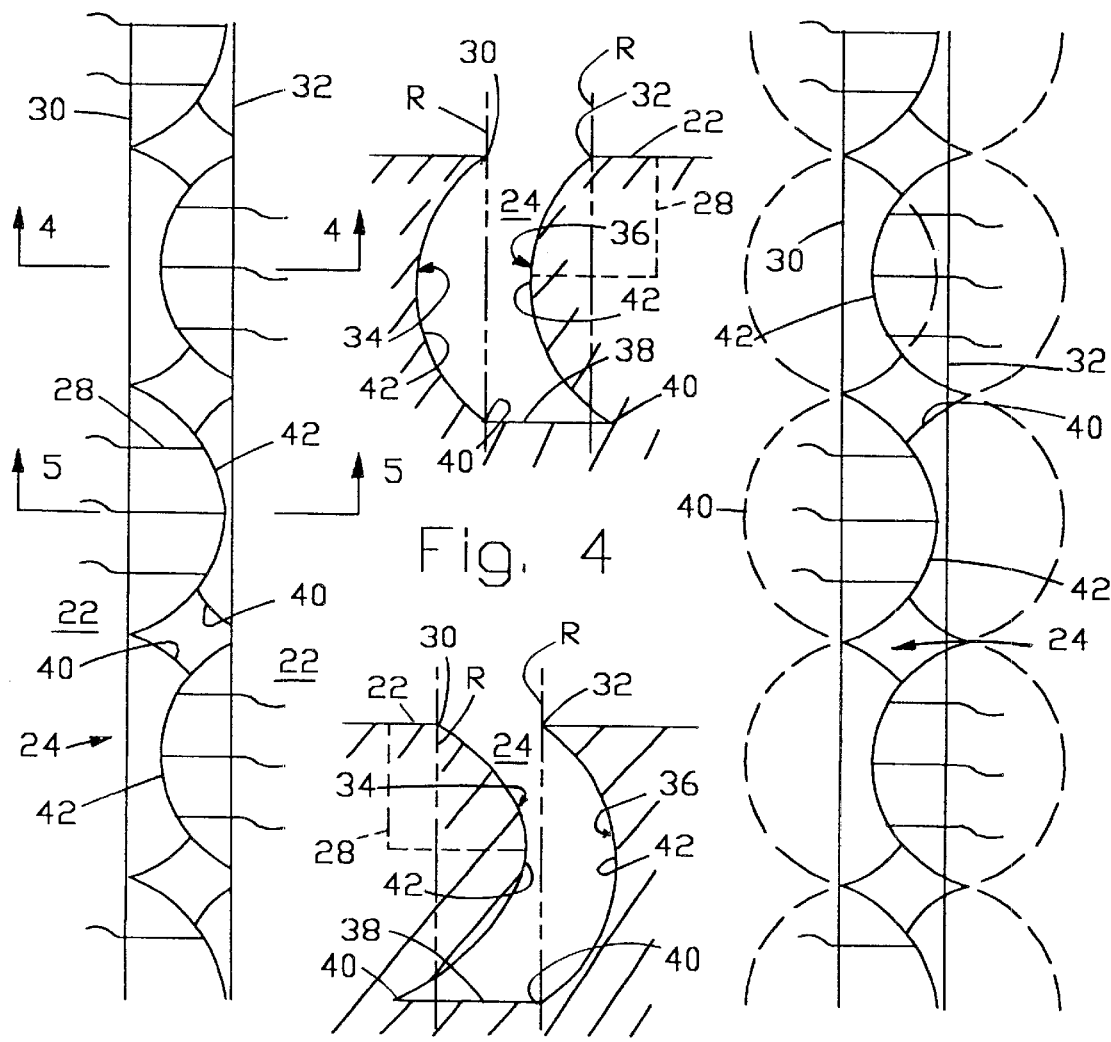

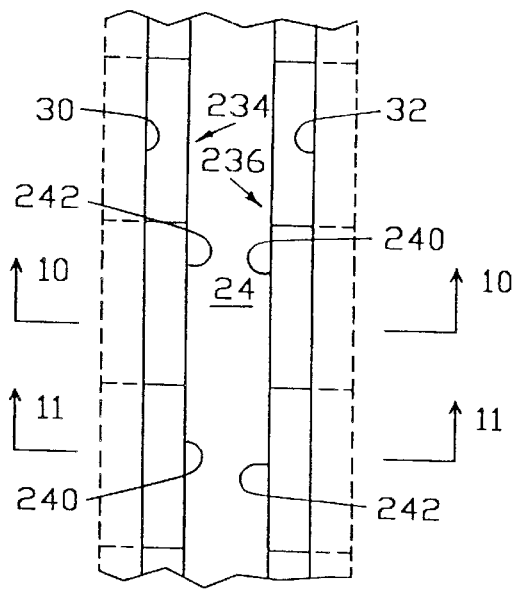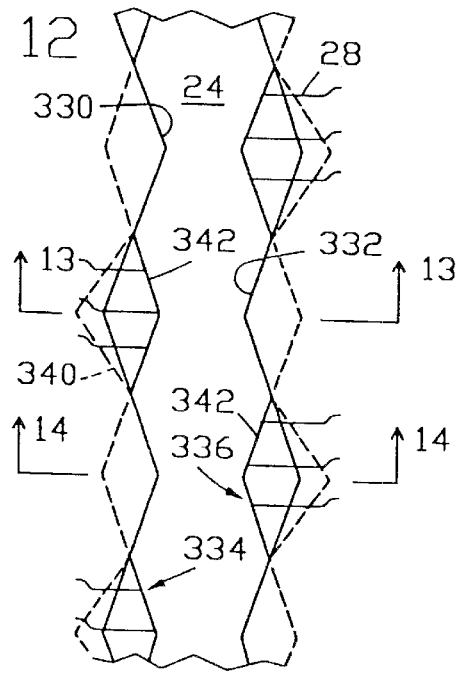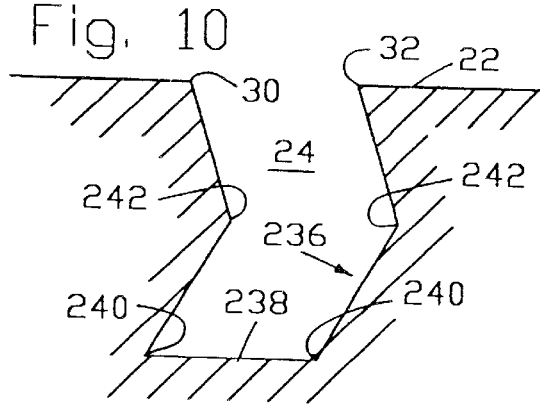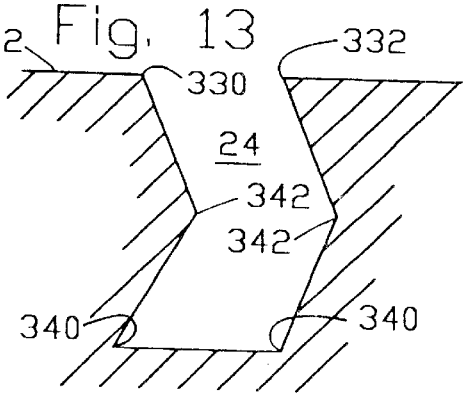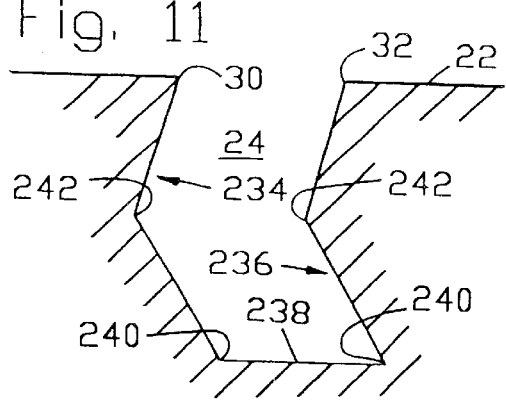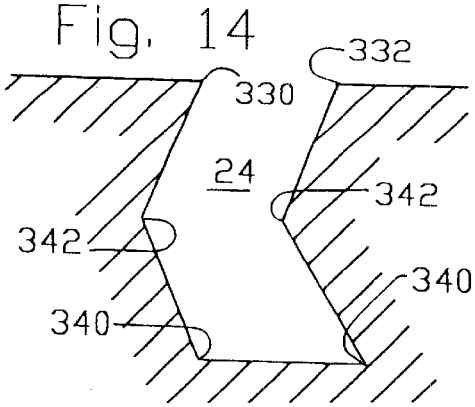

TIRE TREAD HAVING GROOVE WALLS WITH COMPOUND CONTOURS

BACKGROUND AND SUMMARY

The invention relates to tires, and more particularly, to a tread for truck tires for long distance highway travel.

Highway travel, because it involves driving long distances in a substantially straight line with relatively few turns, normally causes low wear in truck tires. However, tires used on highways have been found to experience abnormal wear patterns, which typically appears in three different forms. One form, called "rail wear," occurs where the edge of a rib wears differently than the main portion of the rib, and may appear as shallow pits or recesses at or near rib edges that eventually propagate into and across the rib. A second form, called "flat spotting," usually occurs across the surface of a rib and results in a flat spot being generated in the normally curved surface of the rib. A third type of abnormal wear results in a depression of a rib surface about the entire circumference of the tire. Among other problems, abnormal wear can also generate noise and vibrations that may be transmitted through the vehicle suspension to the driver.

It is thought that stress concentrated at the rib edge contributes to the onset of abnormal wear. Accordingly, making the rib edges less stiff than the rest of the rib is believed to help alleviate abnormal wear. One approach along these lines has been to form the grooves between ribs with negatively sloped walls, that is, the grooves widen from the tread surface to the groove bottom. A difficulty with this approach is that these grooves are also more likely trap and retain stones, which can work down into the groove and damage the tire casing.

The present invention proposes a solution to abnormal wear in a tread that may be used for new tires or for retread tires.

According to the invention, a tire tread has at least one groove extending circumferentially about the tire, the groove having side walls that are shaped with protrusions and recesses that alternate in the circumferential direction along the wall surfaces. The vertices of the protrusions and recesses are located between the upper surface of the tread and the bottom of the groove, so that respective bases surround the protrusions and recesses. The bases generally align with a reference plane normal to the groove bottom wall that passes through respective upper edges of the groove.

A unique feature of a preferred embodiment is that the side wall protrusions and recesses protrude and recess relative to the reference planes. This feature ensures that a space exists below the rib edges over the entire circumference of the tread to provide flexibility to the rib edges.

The groove side walls in accordance with the invention may also be defined as a contour incorporating relatively staggered waveforms. At the bottom of the groove the side walls follow a first waveform and between the groove bottom and the tread upper surface the side walls follow a second waveform, the first and second waveforms being mutually out of phase or relatively staggered. The second waveform is preferably located at half the groove depth, that is, midway between the tread upper surface and the groove bottom.

By waveform is meant a contour having deviations from a straight line, including curves or angles, or a combination. According to a preferred embodiment, the waveforms are regular geometric forms, including sinusoidal, sawtooth or zigzag, step waves, or others.

Preferably, the first and second waveforms on a side wall are 180° out of phase, that is, the protrusions of one waveform are vertically aligned with the recesses of the other waveform. In addition, the amplitude and period of the waveforms can vary relative to one another.

According to a preferred embodiment of the invention, the first and second waveforms are identical waveforms, for example, both being sinusoidal waveforms. Alternatively, the first and second waveforms can be different forms, for example, the first waveform being a sine wave and the second waveform being a zigzag.

According to a preferred embodiment, the waveforms on opposing side walls of a groove are relatively positioned 180° out of phase, a bulge on one wall opposite a cavity on the opposing wall, to produce an intermediate space following the waveform pattern. Alternatively, the waveforms on opposing side walls can be positioned at other relative positions.

According to another aspect of the invention, the edges of the groove walls at the upper surface are formed as linear in the circumferential direction.

Alternatively, and in accordance with a particularly advantageous embodiment of the invention, the upper edges of the groove walls can be formed with a third waveform, the third wave form being out of phase with the second waveform.

The invention may also be incorporated in laterally directed grooves formed in the tread.

The tread may include sipes at the lateral edges of the ribs and sipes may also be formed on the upper surfaces of the side wall waveforms.

The invention advantageously provides flexibility to the rib edges, helping to avoid the stress concentrations that initiate abnormal wear, by providing the cavities below the rib edges. In addition, the shape of the groove space helps avoid trapping stones.

BRIEF DESCRIPTION OF THE DRAWINGS

The invention will become better understood by reference to the following detailed description in conjunction with the appended drawings, in which:

FIG. 2 is a top view of a portion of a tire tread looking perpendicularly into a groove illustrating a first embodiment of the invention;

FIG. 3 is a view of the tread of FIG. 2 showing more detail;

FIG. 4 a sectional view of the tire tread of FIG. 2 taken along the lines 4—4;

FIG. 5 is a sectional view of the tire tread of FIG. 2 taken along the lines 5—5;

FIG. 9 is a partial top view of a tire tread according to another alternative embodiment;

FIG. 10 is a sectional view of the tread of FIG. 9 taken along the lines 10—10;

FIG. 11 is a sectional view of the tread of FIG. 9 taken along the lines 11—11;

FIG. 12 is a top view of a portion of a tire tread according to yet another embodiment;

FIG. 13 is a sectional view of the tread of FIG. 12 taken along the lines 13—13; and, FIG. 14 is a sectional view of the tread of FIG. 12 taken along the lines 14—14.

DETAILED DESCRIPTION

Figure 1:
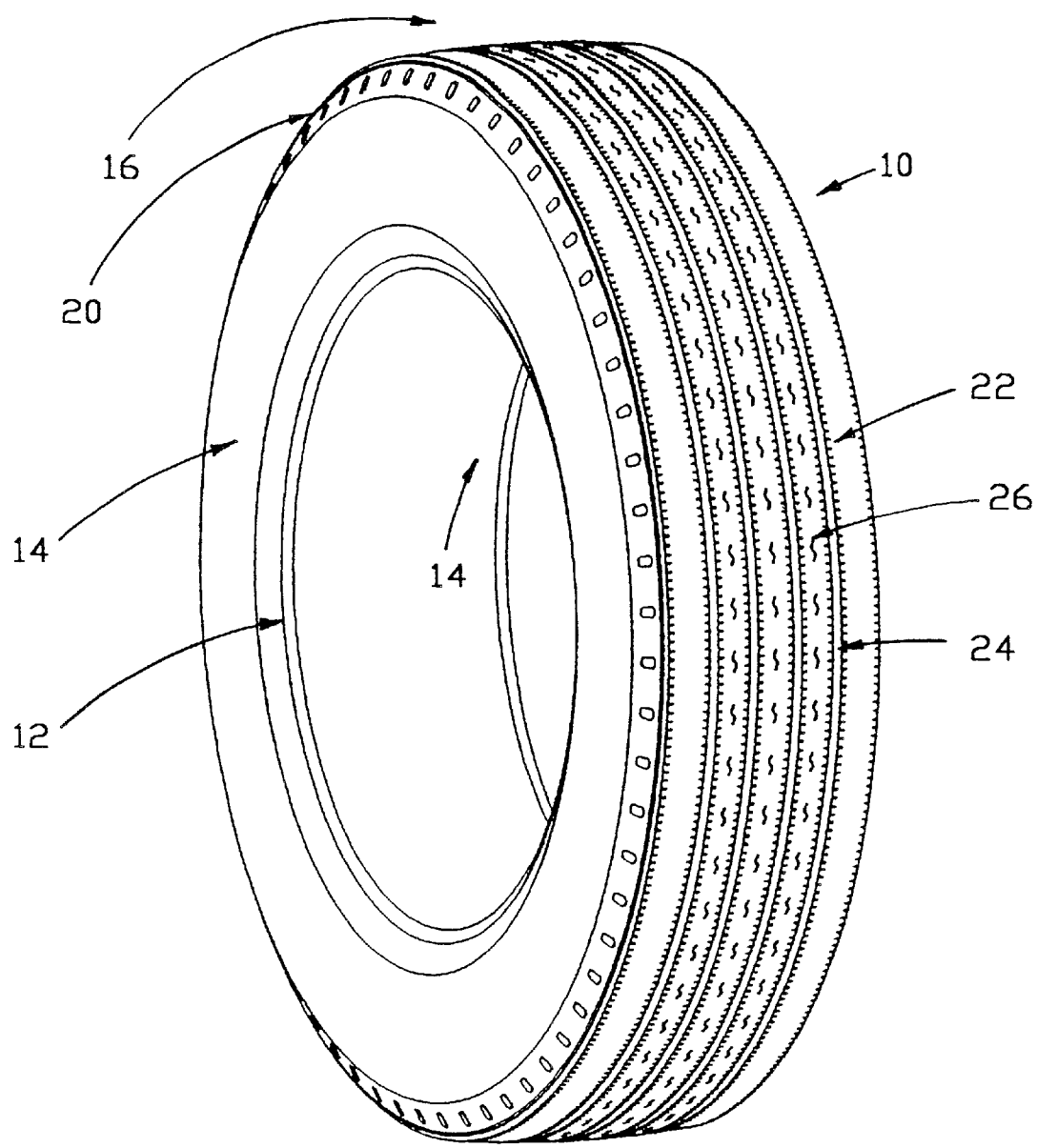
FIG. 1 is a perspective view of a tire tread.

A truck tire is shown in perspective view in FIG. 1. The tire 10 includes a mounting bead area 12, opposing side walls 14, and a tread 20 bonded on a summit 16. The tread 20 extends circumferentially around the tire. The tread 20 has an upper surface 22 that includes a plurality of circumferentially directed ribs 26 separated by grooves 24. The grooves 24 and ribs 26 shown in FIG. 1 are formed with the edges following straight circumferential lines at the upper surface 22. As explained more fully below, alternatively, the groove edges can be contoured, for example, being zigzag or curved at the upper surface 22.

The invention relates to the shape of the groove walls. For simplicity in the following description, one groove will be described; however, the invention may be incorporated in any or all of the grooves in a tread, and the following description is intended to apply accordingly. The illustrated tire tread, which is intended usually for a steer position tire, is exemplary. As will be appreciated by those skilled in the art, the invention can be incorporated in any type of tire. A groove, as used herein, is distinguished from a sipe or incision as understood in the art. A groove is formed to be sufficiently wide so there is not normally contact between facing walls.

FIG. 2 is a fragmentary plan view of the tread illustrating a groove 24 in accordance with the invention. For clarity, FIG. 2 is shown without hidden lines, however, FIG. 3 shows the view according to FIG. 2 including details illustrated by hidden lines. FIGS. 4 and 5 are sectional views taken along the lines 4—4 and 5—5, respectively, in FIG. 2.

The groove 24 includes opposing edges 30, 32 at the upper surface 22. Side walls 34, 36 of the groove 24 extend to a bottom wall 38 perpendicularly below the upper surface 22. According to the invention, the side walls 34, 36 are each shaped to follow a first waveform 40 at the groove bottom wall 38 and a second waveform 42, out of phase with the first waveform, at a level between the groove bottom wall and the upper surface 22. By waveform is meant a contour that includes curves or angles. Out of phase means that the waveforms are relatively shifted in the circumferential direction. According to a preferred embodiment of the invention, the waveforms are 180° out of phase, so that the crest or peak of one waveform is aligned perpendicularly with the recess of the other.

According to a preferred embodiment, the curves or angles are regularly repeating elements, forming, for example, sinusoidal waves, sawtooth waves, zigzags, or step waves. A particular preferred embodiment using a sinusoidal waveform is illustrated in FIGS. 2 and 3. In the figures, identical waveforms are used for the first 40 and second 42 waveform, for example, both waveforms being sinusoidal, as illustrated in FIGS. 2 and 3. Alternatively, different waveforms can be used for the first and second waveform.

As may be seen in particular in FIGS. 3, 4, and 5, the waveform shapes formed in the side walls 34, 36 present areas that alternately project and recess relative to reference planes R perpendicular to the bottom wall 38 and incident on the respective upper edges 30, 32 of the groove. The protrusions, that is, the portions projecting into the groove, advantageously narrow the groove opening to help prevent stones from being trapped in the groove. The recesses of the contour, the portions that are recessed relative to the reference planes R, provide flexibility to the respective upper edge 30, 32 by forming a concavity perpendicularly under the respective edge, allowing the upper edge some freedom to move vertically in response to a load. Each protrusion and each recess forms an apex defined by the second waveform at a point spaced from the respective upper edge and bottom wall. The protrusions and recesses are thus each surrounded by a base from which the side wall surfaces slope to the respective apex.

According to a preferred embodiment illustrated in FIGS. 2–5, the protrusions extend laterally or transversely at least to a circumferential centerline or midpoint of the groove, and more preferably, substantially across the width of the groove. The protrusions are not intended to contact the opposing wall under normal conditions so as not to disturb the flexibility provided to the corresponding upper edge of the groove wall.

Flexibility is also imparted to the upper edges 30, 32 for the side wall portions that include the protrusions by positioning the first wave form 40, which defines the bottom surface of the protrusion, to be transversely outward from the groove 24 relative to the respective upper edge. At the intersection with the bottom wall 38, the side walls 34, 36 follow the first waveform 40 in the recessed region beneath the protrusion. The side walls 34, 36 extend transversely outwardly from the groove center past a plane defined by the respective upper edges 30, 32, thus undercutting the upper edges. The recessed regions of the groove wall defined by the first waveform form a concavity directly below the respective upper edge. The concavity imparts flexibility to the upper edge by permitting some vertical movement of the edge in response to a load.

It is believed that waveforms according to the invention provide a substantially uniform flexibility to the upper edges about the circumference of the tread. This, in turn, is believed to prevent or at least delay the onset of abnormal wear by avoiding high stress areas at the edges.

The amplitude of the protrusions and recesses, that is, the distance in the transverse direction that the protrusions and recesses extend from the reference plane, can be chosen to adjust the degree of flexibility imparted to the upper edges. Accordingly, the protrusion and recess amplitudes may differ for a single waveform, and the protrusion and recess amplitudes for the first and second waveform may also differ.

The tread 22 includes sipes 28 formed in the upper surface 22 and the uppermost portions of the projected portions of the side walls 34, 36. According to the illustrated embodiment in FIGS. 4 and 5, the sipes extend downward from the upper surface 22 of the tread about half of the groove depth, to about the level of the second waveform. As the tread wears, the sipe effective length will increase, as will be appreciated from the figures, which helps maintain tread performance.

Figure 6:
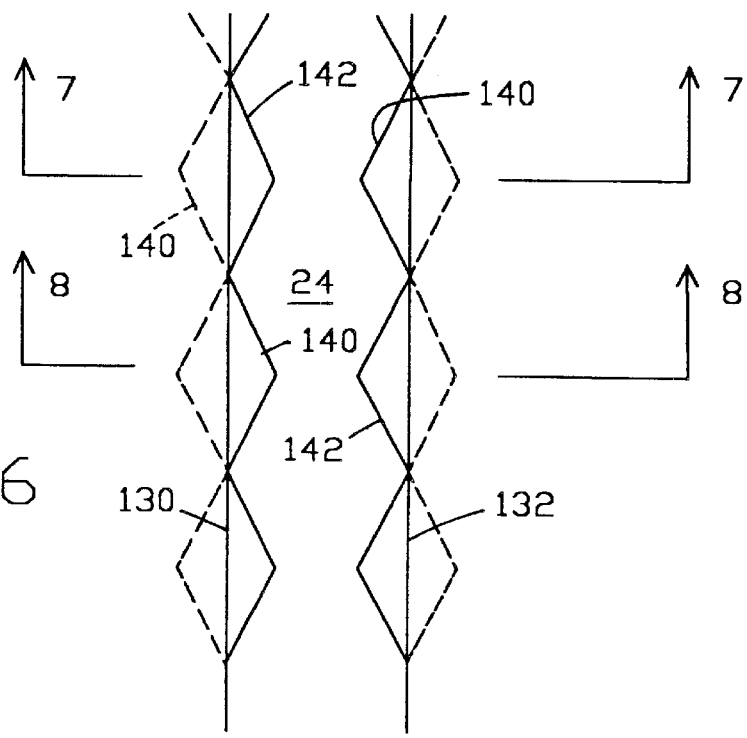
FIG. 6 is a top view of a portion of a tire tread according to an alternative embodiment.
Figure 7:
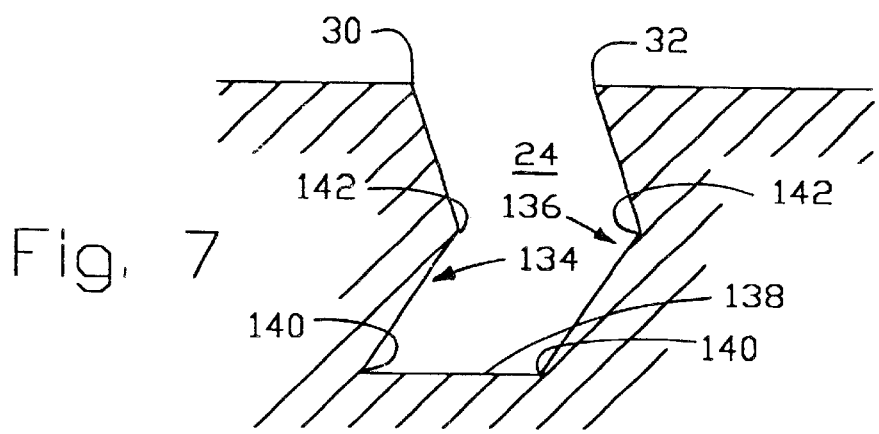
FIG. 7 is a sectional view of the tire tread of FIG. 6 taken along the lines 7—7.
Figure 8:
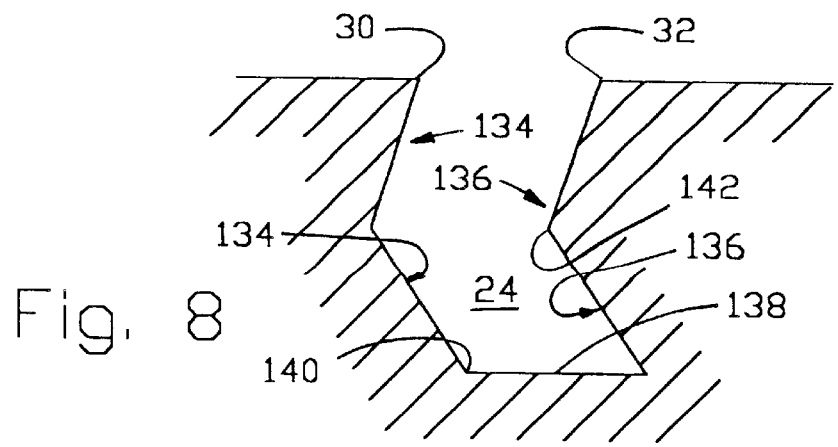
FIG. 8 is a sectional view of the tire tread of FIG. 6 taken along the lines 8—8.

FIG. 6 shows an alternative embodiment in which the side walls 134, 136 are formed with staggered or out-of-phase sawtooth or zigzag waveforms. As shown in FIGS. 7 and 8, which are sections of the groove 24 shown in FIG. 6, the first 140 and second 142 sinusoidal waveforms are contiguously connected to provide alternating protrusions and recesses in the form of angled concave and convex areas in the side walls.

FIGS. 7 and 8 show that the convex protrusions are provided flexibility by the positioning of the first waveform 140 farther from the groove than the respective upper edge 30, 32, as described above in connection with FIGS. 4 and 5.

The embodiment illustrated in FIGS. 6, 7, and 8 shows the protrusions of the second waveform 142 extending less than half of the width of the groove to illustrate an alternative to the substantially full groove width waveforms shown in FIGS. 2–5. Although not shown in FIGS. 6, 7, and 8, sipes may also be provided in the tread surface and projecting portions of the side walls as illustrated in FIG. 2.

FIG. 9 illustrates another embodiment of the invention in which the first waveform 240 and second waveform 242 are both step waves or block shaped waves. FIG. 10 is a sectional view of the embodiment of FIG. 9 taken along the lines 10—10, and FIG. 11 is a sectional view taken along the lines 11—11 of FIG. 9. The sectional views show that in profile, the first 240 and second 242 waveforms are contiguously connected to define zigzags, similar to the form shown in FIGS. 7 and 8. The first waveform 240, in the area where the second waveform 242 forms a protrusion, extends transversely outward from a groove centerline to form a cavity below the respective upper edge 30, 32 in the same manner as described above.

It is to be understood that the sectional views shown in the figures are not meant to define a particular waveform as requiring a match with the illustrated sectional profile. Those skilled in the art will understand, for example, that the zigzag form of FIG. 6 may incorporate a curved sectional profile as in FIGS. 4 and 5. The other waveform embodiments similarly may be formed with any sectional profile.

According to another aspect of the invention, illustrated in FIG. 12, the upper edges 330, 332 of the groove walls are also formed with a waveform in the circumferential direction. FIG. 12 illustrates a groove in which the upper edges 330, 332 are formed with zigzag waveforms, and the side walls 334, 336 are also formed with staggered zigzag waveforms 340, 342. Sipes,28 are formed in the upper surface 22 and the upper portions of the side walls 334, 336, similar to those shown in FIG. 2. The waveform of the upper edges 330, 332 is staggered or out of phase with relation to the second waveform 342, which is a preferred way to arrange the contours. The waveform of the upper edges 330, 332 may selectively be in phase with the first waveform 340, as illustrated in FIG. 12.

The upper edges of the groove walls can be shaped with other forms, for example, sinusoidal waves or step waves, which may not necessarily be the same as the waveforms incorporated in the groove side walls. For example, a groove may be formed with zigzag upper edges and sinusoidal side walls contours.

The staggered waveform contours of the side walls may be incorporated in transversely extending grooves also.

The invention has been described in terms of preferred principles, structure, and embodiments. Those skilled in the art will recognize that changes to the described structure can be made without departing from the scope of the invention as defined by the following claims.

What I claim is:

1. A tire having a tread, the tread comprising an upper surface and having at least one circumferentially extending groove formed therein, the groove being bounded by a bottom wall and opposing side walls, wherein each side wall is formed at the bottom wall with a first waveform extending in the circumferential direction, and at a level between the upper surface and the bottom wall is shaped with a second waveform extending in the circumferential direction, the first waveform and the second waveform being mutually out of phase so that each side wall has a contour of alternating protruding and recessed portions, the second waveform defining apexes of the protruding and recessed portions;

wherein the groove is formed to be sufficiently wide so there is not normally contact between the opposing side walls so that the groove is neither a sipe nor an incision;

wherein opposing edges of the groove at the upper surface are linear in the circumferential direction.

2. A tire having a tread, the tread comprising an upper surface and having at least one circumferentially extending groove formed therein, the groove being bounded by a bottom wall and opposing side walls, wherein each side wall is formed at the bottom wall with a first waveform extending in the circumferential direction, and at a level between the upper surface and the bottom wall is shaped with a second waveform extending in the circumferential direction, the first waveform and the second waveform being mutually out of phase so that each side wall has a contour of alternating protruding and recessed portions, the second waveform defining apexes of the protruding and recessed portions;

wherein the groove is formed to be sufficiently wide so there is not normally contact between the opposing side walls so that the groove is neither a sipe nor an incision;

wherein opposing edges of the groove at the upper surface are shaped in a third waveform, the third waveform and the second waveform being out of phase in the circumferential direction.

3. The tire as claimed in claim 2 wherein the third waveform is one of a sinusoidal wave, a zigzag wave, and a step wave.

* * * * *